J. PRIBULA.
TRACTOR.
APPLICATION FILED JAN. 30, 1919. RENEWED OCT. 4, 1920.

1,369,540. Patented Feb. 22, 1921.

Inventor
John Pribula

UNITED STATES PATENT OFFICE.

JOHN PRIBULA, OF CHICAGO, ILLINOIS.

TRACTOR.

1,369,540. Specification of Letters Patent. Patented Feb. 22, 1921.

Application filed January 30, 1919, Serial No. 274,040. Renewed October 4, 1920. Serial No. 414,620.

*To all whom it may concern:*

Be it known that I, JOHN PRIBULA, a declarant Slovak citizen of the United States, residing at Chicago, in the county of Cook and State of Illinois, have invented certain new and useful Improvements in Tractors, of which the following is a specification.

This invention relates to improvements in plow attachment.

The primary object of the invention is to provide a plow attachment whereby an ordinary motorcycle may be readily converted into a tractor for cultivating, drilling or any other preferred manner operating upon ground.

With these objects in view together with others which will appear as the description proceeds, the invention resides in the novel construction, combination and arrangement of parts, all as will be described more fully hereinafter, illustrated in the drawing, and particularly pointed out in the claim.

In the drawing:—

Figure 1:
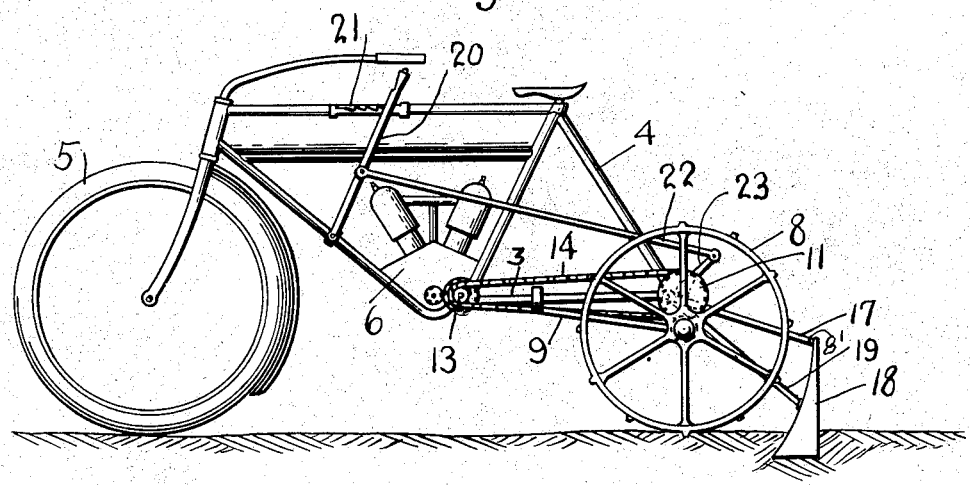
Figure 1 is a side elevation of a motorcycle of conventional form equipped with a digging mechanism constructed in accordance with the invention.

Referring now more particularly to the drawing, in which I show my plow attachment as secured to a motorcycle, 4 indicates the frame of a conventional form of motorcycle having the usual steering wheel 5 at the forward end thereof, and 6 indicates the motor supported by the frame for propelling the vehicle.

Figure 2:
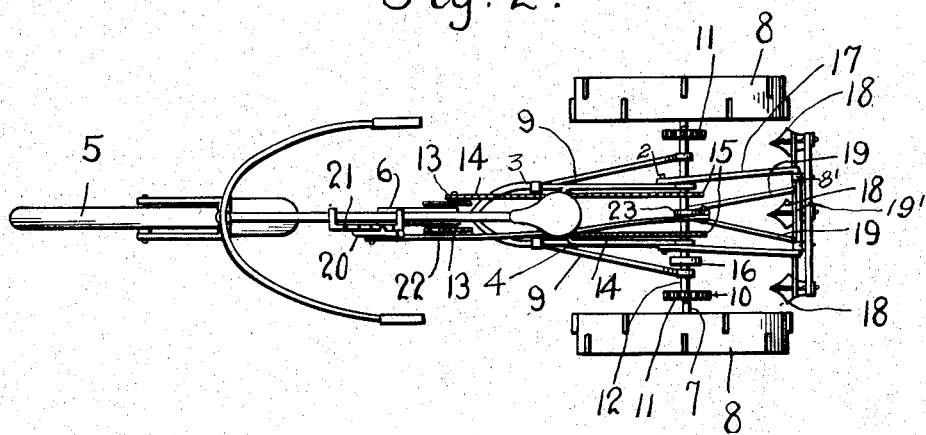
Fig. 2 is a top plan view of the device illustrated in Fig. 1.

In carrying out the invention, use is made of a tractor device illustrated particularly in Fig. 2 of the drawings, wherein a jack shaft 7 of suitable length and diameter carries at its ends the ground engaging cleated wheels 8. This jack shaft, in practice, is suitably connected to the frame of the vehicle so as to be rigidly supported thereby by the supporting bars 9. The shaft 7 is provided with spaced gear wheels 10, which mesh with gears 11 secured to the ends of the power or drive shaft 12 at the rear end of the vehicle frame 4 and which usually supports the drive wheel of the motorcycle. The power shaft 12 may be connected with the engine shaft 13 of motor 6 by a chain 14, the chain passing over the sprockets 15 secured to the said drive shaft. Should the device be used in connection with a belt drive motorcycle, the shaft 12 will be equipped with a belt or band wheel 16.

From this construction, it is obvious that when the motor 6 is in operation, power will be transmitted through chains 14 to the power shaft 12, and this power will in turn be applied to the jack shaft 7 by means of the intermeshing gears 10—11. The vehicle will therefore be caused to move over the ground.

The supporting stand or frame common to vehicles of this character for the purpose of holding the drive wheel up off the ground is employed to carry agricultural implements. Held to the frame members 3, 3, by means of the bolts 2, 2, are the parallel arms 17, 17, of the U-shaped stand, including the straight central portion 19', to which are fixed the supporting ears 8', 8', of the shovels 18 as clearly shown in the drawings. As shown in Fig. 2, the arms 17 pass above the power shaft 12, while the ears 8', are located near the upper end of said shovels 18. These digging shovels can therefore be moved toward or away from the ground by simply moving the stand and this movement may be carried out through the instrumentality of the lever 20 upon the vehicle frame. The lever travels over a suitable rack 21 on the vehicle frame, so that the same can be held in various positions of adjustment. A link 22 is connected at its forward end to the lever 20 and at its rear end to an arm 23 operatively connected with the stand, and it is obvious, therefore, that forward or rearward swinging movement of lever 20 will cause the frame or stand to be moved toward or away from the ground. The digging depth of the shovels 18 can therefore be accurately controlled.

From the foregoing it is obvious that I have provided a plow attachment of extremely simple and inexpensive nature for easily and quickly conveying the ordinary motorcycle into an agricultural tractor. The operator directs the course of the vehicle from his position upon the seat, and as the lever 20 is within convenient reach of the operator, the digging elements may be quickly and easily controlled. A tractor requiring very little operating exercise is thus provided.

In the foregoing description, I have described the invention as used in connection with plows or cultivators, but it will be understood that the invention may be successfully carried out in adapting the vehicle to drills, cultivators, planters, and other such agricultural implements.

While the above is a description of the preferred embodiment of the invention, it will be understood that I need not confine myself to the exact detail of construction set forth as changes may be made in the construction and arrangement of parts without departing from the spirit of the invention as defined by the claim.

I claim:—

A plow attachment comprising in combination, with the frame of a motorcycle, a shaft carried by said frame, a stand including two parallel arms and a straight central portion, bolts extending from said frame and supporting said arms, a digging shovel, ears fixed to the upper end of said shovel and engaging said straight central portion, a crank arm on said shaft, means to operate said crank arm, and a link extending from said crank arm and fixed to said shovel, whereby on actuating said crank arm said shovel may be raised and lowered.

In testimony whereof I affix my signature.

REV. JOHN PRIBULA.